(12) United States Patent
Inoue et al.

(10) Patent No.: US 11,975,388 B2
(45) Date of Patent: May 7, 2024

(54) TITANIUM-BASED POROUS BODY AND METHOD FOR PRODUCING TITANIUM-BASED POROUS BODY

(71) Applicant: Toho Titanium Co., Ltd., Kanagawa (JP)

(72) Inventors: Yosuke Inoue, Kanagawa (JP); Shougo Tsumagari, Kanagawa (JP)

(73) Assignee: Toho Titanium Co., Ltd., Kanagawa (JP)

( * ) Notice: Subject to any disclaimer, the term of this patent is extended or adjusted under 35 U.S.C. 154(b) by 0 days.

(21) Appl. No.: 18/019,709

(22) PCT Filed: Aug. 17, 2021

(86) PCT No.: PCT/JP2021/030062
§ 371 (c)(1),
(2) Date: Feb. 3, 2023

(87) PCT Pub. No.: WO2022/064898
PCT Pub. Date: Mar. 31, 2022

(65) Prior Publication Data
US 2023/0311205 A1  Oct. 5, 2023

(30) Foreign Application Priority Data

Sep. 28, 2020 (JP) .................. 2020-162508

(51) Int. Cl.
*B22F 3/11* (2006.01)
*B22F 1/052* (2022.01)
*C22C 1/08* (2006.01)

(52) U.S. Cl.
CPC ............... *B22F 3/11* (2013.01); *B22F 1/052* (2022.01); *C22C 1/08* (2013.01); *B22F 2301/205* (2013.01); *B22F 2304/10* (2013.01)

(58) Field of Classification Search
None
See application file for complete search history.

(56) References Cited

U.S. PATENT DOCUMENTS 7,297,271 B2 * 11/2007 Onishi ............... B01D 39/2079
429/522
11,554,415 B2 * 1/2023 Goto ..................... H01M 4/134
(Continued)

FOREIGN PATENT DOCUMENTS

JP   2002/066229 A   3/2002
JP   2002/239321 A   8/2002
(Continued)

OTHER PUBLICATIONS

International Preliminary Report on Patentability and Written Opinion in International Application No. PCT/JP2021/030062 dated Mar. 28, 2023, 4 pages.
(Continued)

*Primary Examiner* — Daniel J. Schleis
(74) *Attorney, Agent, or Firm* — MARSHALL, GERSTEIN & BORUN LLP

(57) ABSTRACT

The titanium-based porous body according to the present invention is in a form of a sheet and contains titanium, and the titanium-based porous body has a thickness of 0.8 mm or less, a porosity of 30% to 65%, a maximum height Rz1 of one sheet surface of 30 μm or less, a ratio of a maximum height Rz2 of other sheet surface to the maximum height Rz1 of the one sheet surface (Rz2/Rz1) of 1.2 or more, and a compression deformation rate of 19% or less.

8 Claims, 2 Drawing Sheets

(56) References Cited

U.S. PATENT DOCUMENTS

2020/0368818 A1* 11/2020 Kubo ................ H01M 10/0585
2021/0016352 A1    1/2021 Goto et al.
2021/0066723 A1    3/2021 Hayakawa et al.

FOREIGN PATENT DOCUMENTS

| JP | 2002-317207 A | 10/2002 |
| JP | 2004-149842 A | 5/2004 |
| JP | 2005-015829 A | 1/2005 |
| JP | 2018/070985 A | 5/2018 |
| WO | WO-2019/180797 A1 | 9/2019 |
| WO | WO-2019/188480 A1 | 10/2019 |

OTHER PUBLICATIONS

Search Report in International Application No. PCT/JP2021/030062 dated Nov. 2, 2021, 4 pages.
Office Action in IN Application No. 202327008182 dated Jun. 13, 2023, 6 pages.

\* cited by examiner

TITANIUM-BASED POROUS BODY AND METHOD FOR PRODUCING TITANIUM-BASED POROUS BODY

FIELD OF THE INVENTION

The present invention relates to a sheet-shaped titanium-based porous body containing titanium, and a method for producing the titanium-based porous body.

BACKGROUND OF THE INVENTION

Conventionally, there is a titanium-based porous body made of pure titanium or a titanium alloy, such as that described in Patent Literature 1.

Patent Literature 1 discloses "a sheet-shaped titanium-based porous body, wherein the titanium-based porous body has a specific surface area of $4.5\times10^{-2}$ to $1.5\times10^{-1}$ m$^2$/g, a porosity of 50 to 70%, a thickness of $4.0\times10^{-1}$ to 1.6 mm, and a surface roughness of 8.0 μm or less on at least one side". As a method for producing the "sheet-shaped titanium-based porous body", Patent Literature 1 describes "placing a deformed titanium powder having an average particle diameter of 10 to 50 μm, a D90 of less than 75 μm, and an average circularity of 0.50 to 0.90 on a setter in a dry process and without pressure, and then sintering it at 800 to 1100° C.".

CITATION LIST

Patent Literature

[Patent Literature 1] Japanese Patent Application Publication No. 2018-70985 A

SUMMARY OF THE INVENTION

Technical Problem

Titanium-based porous bodies have air permeability or liquid permeability, and are being studied for use as gas diffusion layers or electrodes in next-generation batteries.

In order to use the titanium-based porous body for such battery applications, a sheet-shaped titanium-based porous body may be pressed against an electrolyte membrane under action of relatively high pressure, for example, for the purpose of reducing contact resistance or the like. In this case, it is preferable that the electrolyte membrane and the titanium-based porous body are in close contact with each other. On the other hand, in order to improve the adhesion of the electrolyte membrane to the titanium-based porous body, a relatively fine titanium-containing powder is used to produce a titanium-based porous body so as to lead to a smooth sheet surface of the titanium-based porous body, so that the porosity is reduced as a whole, and the air permeability or liquid permeability is decreased.

Further, for the above applications, the titanium-based porous body may be compressed and deformed by the action of pressure, resulting in a decrease in voids and a decrease in air permeability or liquid permeability. Patent Literature 1 does not pay attention to this point in particular.

An object of the present invention is to provide titanium-based porous body which has a somewhat smooth sheet surface on one surface side, and exhibits required air permeability or liquid permeability on the other surface side, and which can suppress compression deformation at a relatively small level when a predetermined pressure is applied, and a method for producing the titanium-based porous body.

Solution to Problem

As a result of extensive studies, the present inventors have found that a titanium-containing powder having a predetermined particle diameter as a raw material is deposited in a dry process on a molding surface of a mold, and the titanium-containing powder on the molding surface is heated at a relatively high temperature for a long period of time, whereby one sheet surface of a titanium-based porous body in a form of a sheet, which is formed on the molding surface side, is satisfactorily smoothed. Furthermore, by appropriately controlling the particle diameter of the titanium-containing powder used as a raw material, one sheet surface of the titanium-based porous body is smoothed as described above, while the required air permeability or liquid permeability can be ensured on the other sheet surface side. This would be because when the titanium-containing powder having a predetermined particle diameter is deposited on the molding surface, fine particles of the powder are naturally collected on the molding surface side.

Moreover, in this case, the present inventors have newly found that the heating of the titanium-containing powder having a predetermined particle diameter at a predetermined temperature for a predetermined time results in appropriate proceeding of sintering, so that a desired porosity can be achieved in the titanium-based porous body, and a large compression deformation does not occur when pressure is applied.

The titanium-based porous body according to the present invention is in a form of a sheet and contains titanium, and the titanium-based porous body has a thickness of 0.8 mm or less, a porosity of 30% to 65%, a maximum height Rz1 of one sheet surface of 30 μm or less, a ratio of a maximum height Rz2 of other sheet surface to the maximum height Rz1 of the one sheet surface (Rz2/Rz1) of 1.2 or more, and a compression deformation rate of 19% or less.

The titanium-based porous body according to the present invention preferably has a compression deformation rate of 12% or less.

The titanium-based porous body according to the present invention preferably has a titanium content of 75% by mass or more.

The titanium-based porous body according to the present invention may have a titanium content of 98% by mass or more.

A method for producing a titanium porous material according to the present invention comprises: a raw material preparation step of preparing, as a raw material, a titanium-containing powder having a 10% particle diameter D10 of 30 μm or less and a 90% particle diameter D90 of 15 μm to 105 μm, and has a ratio (D90/D10) of the 90% particle diameter D90 to the 10% particle diameter D10 of 2.0 or more; a powder depositing step of depositing the titanium-containing powder on a molding surface of a mold in a dry process; and a powder sintering step of heating the titanium-containing powder on the molding surface to a temperature of 980° C. or more for 2 hours or more.

In the method for producing a titanium-based porous body according to the present invention, a titanium-based porous body having a thickness of 0.8 mm or less can be produced.

Advantageous Effects of Invention

The titanium-based porous body according to the present invention has one sheet surface that is smooth to some extent, exhibits a required air permeability or liquid permeability on the other sheet surface side, and enables compression deformation to be suppressed at a relatively low level when a predetermined pressure is applied. Also, the method for producing a titanium-based porous body according to the present invention is suitable for producing such a titanium-based porous body.

DETAILED DESCRIPTION OF THE INVENTION

Figure 1A:
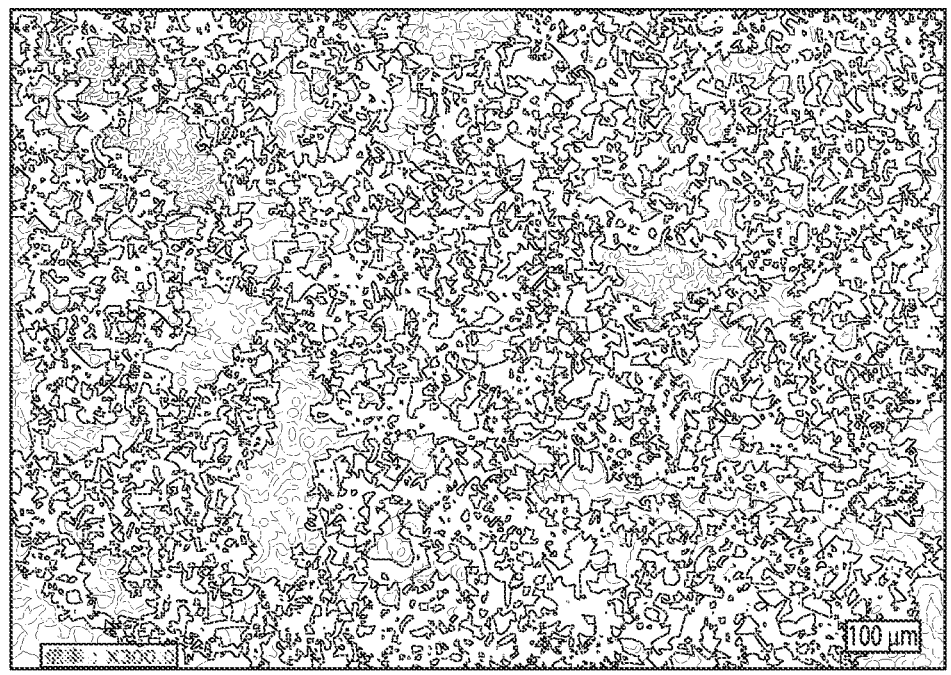
FIG. 1(a) is a SEM photograph of an electrolyte membrane against which a surface on a molding surface side of a titanium-based porous body according to Example 4 is pressed.

Embodiments of the present invention will be described in detail below.

A titanium-based porous body according to an embodiment of the present invention contains titanium, has a sheet-like shape with a thickness of 0.8 mm or less, and a porosity of 30% to 65%. The titanium-based porous body has a maximum height Rz1 of one sheet surface of 30 μm or less, and a ratio (Rz2/Rz1) of a maximum height Rz2 of other sheet surface to the maximum height Rz1 of the one sheet surface of 1.2 or more. Further, the titanium-based porous body has a compression deformation ratio of 19% or less.

(Composition)

The titanium-based porous body is made of, for example, pure titanium or a titanium alloy. The titanium content of the titanium-based porous body may be 75% by mass or more, regardless of whether it is made of pure titanium or a titanium alloy.

For the pure titanium, the titanium content of the titanium-based porous body may be, for example, 98% by mass or more, and typically 99.0% by mass to 99.8% by mass. The titanium-based porous body made of pure titanium may contain at least one impurity selected from the group consisting of oxygen, nitrogen and carbon as the balance of titanium.

When the titanium-based porous body is made of the titanium alloy, the titanium content of the titanium-based porous body may be, for example, 75% to 97% by mass, and typically 85% to 97% by mass. The titanium-based porous body made of the titanium alloy may include, in addition to titanium, alloy elements such as Fe, Sn, Cr, Al, V, Mn, Zr, Mo, Pd, Pt, Au, Ta, Nb, Ni, and Ru. Specific examples of the titanium alloy include Ti-6-4(Ti-6Al-4V), Ti-5Al-1 Fe, Ti-5Al-2.5Sn, Ti-8-1-1(Ti-8Al-1Mo-1V), Ti-6-2-4-2(Ti-6Al-2Sn-4Zr-2Mo-0.1Si), Ti-6-6-2(Ti-6Al-6V-25n-0.7Fe-0.7Cu), Ti-6-2-4-6(Ti-6Al-2Sn-4Zr-6Mo), SP700(Ti-4.5Al-3V-2Fe-2Mo), Ti-17(Ti-5Al-2Sn-2Zr-4Mo-4Cr), β-CEZ(Ti-5Al-2Sn-4Zr-4Mo-2Cr-1Fe), TIMETAL555, Ti-5553(Ti-5Al-5Mo-5V-3Cr-0.5Fe), TIMETAL21S(Ti-15Mo-2.7Nb-3Al-0.2Si), TIMETAL LCB(Ti-4.5Fe-6.8Mo-1.5Al), 10-2-3(Ti-10V-2Fe-3Al), Beta C(Ti-3Al-8V-6Cr-4Mo-4Cr), Ti-8823(Ti-8Mo-8V-2Fe-3Al), 15-3(Ti-15V-3Cr-3Al-3Sn), Beta III(Ti-11.5Mo-6Zr-4.5Sn), Ti-13V-11Cr-3Al, and the like. In the specific examples of the alloys as described above, the number added before each metal element represents a content (% by mass) of that metal element. For example, "Ti-6Al-4V" means a titanium alloy containing 6% by mass of Al and 4% by mass of V as alloying elements.

(Thickness)

The titanium-based porous body has a sheet-like outer shape as a whole and a thickness of 0.8 mm or less. If the thickness of the titanium porous material is more than 0.8 mm, it tends to be difficult to ensure a good porosity. The thickness of the titanium-based porous body may be 0.2 mm or more, for example, 0.2 mm to 0.8 mm. Also, the thickness of the titanium-based porous body may be 0.5 mm to 0.8 mm. The thickness of the titanium-based porous body can be measured by means of a thickness gauge, for example, using ABS Digimatic Thickness Gauge 547-321 from Mitutoyo Corporation. The thickness of the titanium-based porous body means a thickness before compression deformation when measuring a compression deformation ratio as described below.

(Porosity)

The titanium-based porous body has a porosity of 30% to 65%. This can achieve the required air permeability or liquid permeability while having a certain degree of strength. The porosity of the titanium-based porous body is preferably 35% to 60%. Moreover, the porosity of the titanium-based porous body is preferably 35% to 45%. The porosity ε of the titanium-based porous body is calculated using an apparent density ρ' calculated from a volume and mass obtained from a width, length, and thickness of the titanium-based porous body, and a true density ρ of a metal making up the titanium-based porous body (e.g., 4.51 g/cm3 for pure titanium and 4.43 g/cm3 for Ti-6Al-4V) by the equation: $\varepsilon = (1 - \rho'/\rho) \times 100$.

(Surface Roughness)

The titanium-based porous body in the form of the sheet has two sheet surfaces: one sheet surface and other sheet surface on the back side, which face the opposite sides to each other. One of the sheet surfaces has a maximum height Rz1 of 30 μm or less, and preferably 25 μm or less. The maximum height Rz of each sheet surface is measured, the maximum height Rz of the sheet surface with the smaller value is defined as the maximum height Rz1, and the maximum height Rz of the sheet surface with the larger value is defined as the maximum height Rz2.

It is believed that the contact resistance can be effectively reduced by pressing the one smooth sheet surface having the maximum height Rz1 of 30 μm or less against the electrolyte membrane of the battery as described above. If the maximum height Rz1 of the one sheet surface pressed against the electrolyte membrane is more than 30 μm, the reduction of the contact resistance may be insufficient due to larger irregularities on the one sheet surface.

The smaller the maximum height Rz1 of one sheet surface of the titanium-based porous body, the higher the adhesion to the electrolyte membrane, which is preferable. Therefore, although there is no particular lower limit for the maximum height Rz1 of one sheet surface, the maximum height Rz1 of one sheet surface may be 3 μm or more, or even 8 μm or more. Also, the maximum height Rz1 of one sheet surface may be 15 μm or more.

As described above, in order to ensure the adhesion to the electrolyte membrane on one sheet surface while increasing air permeability or liquid permeability on the other sheet surface, the ratio (Rz2/Rz1) of the maximum height Rz2 of the other sheet surface to the maximum height Rz1 of one sheet surface of the titanium-based porous body in the form of the sheet is 1.2 or more, and preferably 2.0 or more. By accepting irregularities to a certain extent on the other sheet surface which is the opposite side of the one smooth sheet surface, it becomes easier to ensure good air permeability or liquid permeability. Although the upper limit of the ratio (Rz2/Rz1) of the maximum height Rz2 of the other sheet surface to the maximum height Rz1 of one sheet surface is not particularly limited, it may be 5.0 or less, or 3.5 or less. The ratio (Rz2/Rz1) of the maximum height Rz2 of the other sheet surface to the maximum height Rz1 of one sheet surface may be 1.2 to 2.5.

The above maximum heights Rz1 and Rz2 of the sheet surfaces of the titanium-based porous body can be achieved by preparing a titanium-containing powder having an adjusted particle size distribution as in a production method as described below, and depositing the titanium-containing powder to a molding surface of a mold in a dry process.

The maximum heights Rz1 and Rz2 of the sheet surfaces of the titanium-based porous body are measured according to JIS B 0601 (1994).

(Compression Deformation Rate)

The titanium-based porous body has a compression deformation rate of 19% or less, which is a rate of change in thicknesses before and after an operation for applying a pressure of 65 MPa for 3 minutes in the thickness direction to compress it and then releasing the pressure is performed twice.

This can allow the required air permeability or liquid permeability to be achieved, because even if the titanium-based porous body is pressed against the electrolyte membrane for use in a certain battery, a certain number of voids are ensured inside the titanium-based porous body. In other words, if the compression deformation rate is more than 19%, the voids will be greatly reduced when it is pressed against the electrolyte membrane, and the required air permeability or liquid permeability will not be exhibited.

The present inventors presume that the reason why the compression deformation rate may vary even if the porosity before the compression process is the same is as follows:

When the sintering temperature is lower to a certain extent or the sintering time is shorter, the bonded part between the particles of the titanium-containing powder become thinner. On the other hand, if the sintering temperature is higher and the sintering time is loner, the bonded part tends to become thicker.

When a pressure is applied to the titanium-based porous body in the thickness direction, the deformation of the titanium-based porous body may include deformation in which the bonded part between the particles formed by sintering or the like is maintained, and deformation in which the bonded part is broken and the particles enter the voids. Here, in a titanium-based porous body having thinner bonded parts, the deformation in which the bonded part is broken is increased even at a relatively low pressure, and the particles tend to enter the voids to fill the voids. This increases the compression deformation ratio. On the other hand, such compression deformation is difficult to occur for a titanium-based porous body in which thicker bonded parts have grown. In fact, in titanium-based porous bodies produced at a lower sintering temperature or a shorter sintering time, the release of the titanium-containing powder is often observed after pressurization.

From such a point of view, the compression deformation rate of the titanium-based porous body is preferably 12% or less. Moreover, the compression deformation rate of the titanium-based porous body is preferably 8% or less. The compression deformation rate may be 2% or more, although it depends on the production conditions of the titanium-based porous body.

More particularly, a compression deformation rate Rd is a value measured by measuring a thickness T1 of the titanium-based porous body before applying a pressure of 65 MPa and a thickness T2 of the titanium-based porous body after applying the pressure and releasing the pressure, and calculated from the equation: $Rd=(1-T2/T1) \times 100$.

It should be noted that to measure the compression deformation rate, the thickness T1 of the titanium-based porous body is previously measured. The titanium-based porous body is sandwiched between flat surfaces of two flat plates or the like in the thickness direction, and the flat surfaces are displaced in a direction to bring them closer to each other, thereby applying a pressure of 65 MPa evenly onto the surface of the titanium-based porous body in the thickness direction for 3 minutes. After the pressure is applied, the pressure is released. Such pressure application and release operations are performed again, and the operation is performed twice in total. Subsequently, the thickness T2 of the titanium-based porous body removed from the space between the flat surfaces is measured. Here, various compression testing devices or other devices capable of applying a pressure to the titanium-based porous body can be used. For the measurement of the thicknesses T1 and T2 of the titanium-based porous body, the thicknesses at five different positions in a plane view of the titanium-based porous body (for example, when the titanium-based porous body is square in a plane view, five positions in total: the center and four corners around it), and average values thereof are determined to be the thicknesses T1 and T2.

(Production Method)

The titanium-based porous body as described above can be produced, for example, as described below.

First, a raw material preparation step is performed to prepare a predetermined titanium-containing powder as a raw material. Here, the predetermined titanium-containing powder has a 10% particle diameter D10 of 30 μm or less, a 90% particle diameter D90 of 15 μm to 105 μm, and a ratio (D90/D10) of the 90% particle diameter D90 to the 10% particle diameter D10 of 2.0 or more.

By setting the 10% particle diameter D10 of the titanium-containing powder to 30 μm or less, fine particles contained in the titanium-containing powder in such a degree of amount tend to be collected on a molding surface on a lower side of a mold in a powder deposition step as described later. This results in one smooth sheet surface of the titanium-based porous body formed by the molding surface, such as the maximum height Rz1 as described above. The 10% particle diameter D10 of the titanium-containing powder is preferably 25 μm or less, and more preferably 20 μm or less. Also, the 10% particle diameter D10 of the titanium-containing powder is preferably 12 μm or less. The 10% particle diameter D10 may be, for example, 3 μm or more.

The 90% particle diameter D90 of the titanium-containing powder affects the ratio of the maximum heights Rz1 and Rz2 of the sheet surfaces, the porosity, and the like of the titanium-based porous body. In particular, the 90% particle diameter D90 of the titanium-containing powder should be 15 μm or more in order to obtain a relatively large maximum height Rz2 and porosity of the other sheet surface. On the other hand, the 90% particle diameter D90 of the titanium-containing powder should be 105 μm or less in order to appropriately suppress compression deformation when a pressure is applied to the titanium-based porous body. From such a point of view, the 90% particle diameter D90 of the titanium-containing powder is preferably 15 µm to 75 µm, and more preferably 30 µm to 60 µm, and even more preferably 40 µm to 60 µm. Also, the 90% particle diameter D90 of the titanium-containing powder is preferably 15 to 30 µm.

In order to achieve both the predetermined maximum heights Rz1 and Rz2 of the sheet surfaces and the desired porosity or compressive deformation amount of the titanium-based porous body, there should be a difference between the 10% particle diameter D10 and the 90% particle diameter D90 of the titanium-containing powder. More particularly, the ratio of the 90% particle diameter D90 to the 10% particle diameter D10 (D90/D10) should be 2.0 or more. That is, the 90% particle diameter D90 should be 2.0 times or more the 10% particle diameter D10. The ratio (D90/D10) is preferably 2.0 to 4.0, and more preferably 2.0 to 3.0.

In order to obtain a titanium-containing powder having such particle diameters, it is also possible to adjust the particle diameters by mixing a plurality of types of powders produced under different powder preparation conditions. For example, a powder having a 90% particle diameter D90 of about 70 µm and a powder having a 90% particle diameter D90 of about 20 µm can be mixed together to adjust the 90% particle diameter D90 of the titanium-containing powder. The same is true for the 10% particle diameter D10, and by mixing powders with different particle diameters, the value of the 10% particle diameter D10 of the titanium-containing powder can be adjusted.

Here, the 10% particle diameter D10 or 90% particle diameter D90 of the titanium-containing powder mean a particle diameter whose cumulative distribution on a volume basis in the particle size distribution obtained by the laser diffraction scattering method is 10% or 90%, respectively.

The titanium-containing powder may be various powders as long as they contain titanium. The titanium content of the titanium-containing powder is preferably 75% by mass or more. The titanium content can also be 95% by mass or more. Examples of the titanium-containing powder that can be used herein include pure titanium powder and/or titanium alloy powder. That is, as the titanium-containing powder, pure titanium powder may be used alone, or one or more titanium alloy powders may be used, or these pure titanium powders may be used in combination with titanium alloy powders. Further, it is possible to use powders of alloying elements such as aluminum, vanadium and iron. If titanium is contained at least a part of particles considered as the entire titanium-containing powder, it can be regarded as the titanium-containing powder.

The pure titanium powder means a powder having a titanium content of 95% by mass or more and substantially consisting only of titanium. Specific examples of the pure titanium powder include hydride de-hydride titanium powder (so-called HDH titanium powder) obtained by hydrogenating sponge titanium or the like, pulverizing it, and then dehydrogenating it, and titanium hydride powder in which the dehydrogenation is not performed after the pulverization, and the like. The hydrogen content of the titanium hydride powder, which is pure titanium powder, is accepted up to 5% by mass.

The titanium alloy powder refers to a powder containing titanium and an alloying element(s). The titanium alloy powder can be used with the elements and their proportions according to the above titanium alloy of the titanium-based porous body to be produced herein. The mass ratio of metals in the titanium-containing powder can be, for example, titanium:alloying element=100:0 to 75:25.

Although an average circularity of the titanium-containing powder is not particularly limited, it may preferably be 0.93 or less. The titanium-containing powder having a low average circularity of 0.93 or less is available at a relatively low price, which is advantageous from the viewpoint of reducing production costs. The average circularity of the titanium-containing powder is preferably 0.91 or less, and more preferably 0.89 or less. Since the HDH titanium powder and titanium hydride powder as described above are obtained through the pulverization, they tend to have a relatively small average circularity. On the other hand, atomized powder obtained by gas atomization or the like often has an average circularity close to 1.00 as compared to the HDH titanium powder and the like.

The average circularity of the titanium-containing powder is determined as follows. Using an electron microscope, a perimeter (A) of a projected area of the particles of the titanium-containing powder is measured, and a ratio of a perimeter (B) of a circle having an area equal to the projected area to the perimeter (A) is defined as a circularity (B/A). An average circularity is obtained by allowing particles to flow together with a carrier liquid in a cell, capturing images of a large number of particles with a CCD camera, calculating the above circularity (B/A) for each particle from 1000 to 1500 individual particle images, and determining an average value of the circularities of the particles. The circularity value increases as the shape of the particle approaches a true sphere, and the circularity of a particle having a perfectly spherical shape is 1.00. Conversely, the circularity value decreases as the shape of the particles departs from a true sphere.

A powder deposition step is then performed. In the powder depositing step, the above titanium-containing powder is deposited and spread in a dry process over the molding surface of the mold. Here, the "dry process" means that a liquid such as a solvent or a binder is not used. In the powder deposition step, the powder is deposited by, for example, dropping the titanium-containing powder in a gas such as air or in a vacuum, rather than settling the titanium-containing powder in a slurry in which the titanium-containing powder is dispersed in a liquid.

In this case, by using the titanium-containing powder having the predetermined particle diameter as described above, relatively fine particles of the titanium-containing powder tend to be collected and located on the lower side (molding surface side) of the deposited layer of the titanium-containing powder deposited on the molding surface of the mold, while particles having larger particle diameter tend to be located on the upper side (opposite to the molding surface side) of the deposited layer of the titanium-containing powder. Thus, among the sheet surfaces of the titanium-based porous body obtained after a powder sintering step as described below, one sheet surface on the molding surface side of the mold is smoothed, resulting in reduced surface roughness.

In the powder deposition step, it is preferable to deposit the titanium-containing powder at least in the depositing direction without applying a pressure in order to obtain the titanium-based porous body having a predetermined air permeability or liquid permeability. This is because intentional pressurization in the depositing direction results in a dense titanium-based porous body after sintering, leading to a decreased air permeability or liquid permeability.

More particularly, on the molding surface of a container-shaped mold having a molding surface and a side wall surrounding it, the titanium-containing powder is shaken off from the upper side and spread onto the molding surface. After depositing the titanium-containing powder on the molding surface to a certain extent, a flat plate-shaped spatula or the like is moved along the upper surface of the side wall, and a part of the titanium-containing powder that has risen on the upper side than the upper surface of the side wall is removed to the outside of the side wall. At this time, any intentional pressurization is not applied to the titanium-containing powder in the depositing direction. This allows the titanium-containing powder to be deposited on the inner side of the side wall of the mold up to the height of the side wall. By adjusting the height of the side wall of the mold or the like, it is possible to produce a titanium-based porous body having any thickness, such as 0.8 mm or less.

In addition, it is also possible to use a flat plate-shaped mold. In this case, the desired thickness (0.8 mm or less, or the like) of the titanium-based porous body can also be achieved by depositing the titanium-containing powder on the molding surface of the flat plate-shaped mold, and then placing a side wall corresponding to the thickness on the molding surface, and then placing a flat plate-shaped spatula or the like along the upper surface of the side wall. In this case, the titanium-containing powder is not intentionally pressurized in the depositing direction.

Subsequently, a powder sintering step is performed to heat the titanium-containing powder deposited on the molding surface of the mold. For example, the titanium-containing powder on the molding surface is placed in a furnace together with the mold and heated, thereby providing a sheet-shaped titanium-based porous body corresponding to the space on the molding surface of the container-shaped mold.

Here, it is important to heat the titanium-containing powder to a temperature of 980° C. or more for 2 hours or more. This can allow the compression deformation rate to be reduced while ensuring the required porosity of the titanium-based porous body.

If the heating temperature is less than 980° C., the compression deformation rate of the titanium-based porous body increases, so that there is concern that air permeability or liquid permeability will decrease due to a decrease in voids when a pressure is applied to the titanium-based porous body. It should be noted that the heating temperature may be 1200° C. or less, in terms of ensuring a certain degree of porosity of the titanium-based porous body. The heating temperature is preferably 1000° C. to 1100° C.

When the above heating temperature is maintained for less than 2 hours, the compression deformation rate of the titanium-based porous body may also increase. This time may be 6 hours or less in view of productivity. It is preferable that the heating temperature is maintained for 2 to 3 hours.

Such a heating temperature and time as described above can provide the titanium-based porous body having a predetermined porosity and a well-reduced compression deformation rate, together with adjusting the particle diameter of the titanium-containing powder as described above. If only fine powder is used and sintered at an elevated temperature for a long period of time, a titanium-based porous body having a low porosity may be obtained, so that air permeability or liquid permeability required for a battery material may not be ensured. On the other hand, in this embodiment, by adjusting the particle diameter of the titanium-containing powder as described above, such a decrease in the porosity can be suppressed even if the powder is heated at a relatively high temperature for a long period of time.

In the powder sintering step, the titanium-containing powder can be heated and sintered in a reduced pressure atmosphere such as a vacuum or in an inert atmosphere. This can prevent the titanium-containing powder from being excessively oxynitrided during sintering. More particularly, the sintering of the titanium-containing powder can be carried out, for example, in a reduced pressure atmosphere in a vacuum furnace with a degree of vacuum reaching $10^{-4}$ Pa to $10^{-2}$ Pa. Alternatively, the sintering of the titanium-containing powder can be carried out in an inert atmosphere with the atmosphere being argon gas. It should be note that a nitrogen gas does not correspond to the inert gas as used herein.

When the titanium-containing powder contains titanium hydride, it is preferable to perform a preliminary heat treatment for dehydrogenation before the sintering. The temperature and time of the preliminary heat treatment can be appropriately determined in view of the content of the titanium hydride powder. As an example, the temperature of the preliminary heat treatment may be 450° C. to 700° C., and the time of the preliminary heat treatment may be 30 minutes to 360 minutes. The preliminary heating treatment can be carried out, for example, in a vacuum furnace in a reduced pressure atmosphere with the degree of vacuum reaching $10^{-4}$ Pa to $10^{-2}$ Pa. Once it is cooled after the preliminary heating treatment, the heating for sintering may be performed, or after the preliminary heating treatment, the temperature may be further increased and the heating for sintering may be performed.

As described above, the titanium-based porous body can be produced. The titanium-based porous body is suitable for use in applications requiring air permeability or liquid permeability, and is suitably used for next-generation batteries, for example, as a gas diffusion layer or electrode pressed against an electrolyte membrane.

Examples

Next, the titanium-based porous body according to the present invention was experimentally produced and will be described below. However, the descriptions herein are for illustrative purposes only and are not intended to be limited.

In the raw material preparation step, each titanium-containing powder whose particle diameter is adjusted as shown in Table 1 was prepared as a raw material. The HDH titanium powder was used as the titanium-containing powder in each of Examples and Comparative Examples. The HDH titanium powder was obtained by hydrogenating pure titanium, pulverizing it, and then dehydrogenating it. All HDH titanium powders had an average circularity of 0.93 or less.

Subsequently, in the powder depositing step, the titanium-containing powder was deposited and spread on a molding surface of a setter that was a mold having a predetermined size. The powder sintering step was then performed, in which a pressure in the vacuum furnace was reduced to $1.0 \times 10^{-2}$ Pa or less, and the titanium-containing powder was heated and sintered on the molding surface in the reduced pressure atmosphere under the conditions as shown in Table 1 to produce a sheet-shaped titanium-based porous body having a rectangular shape of 50 mm long×50 mm wide as viewed in the plane.

For each of the titanium-based porous bodies produced as described above, the thickness, porosity, compression deformation rate, and the maximum height Rz1 of one sheet surface on the molding surface side (molding surface side surface) and the maximum height Rz2 of the other sheet surface on the opposite side (opposite side surface) were measured according to the measurement methods as described above. Here, Surftest SJ-210 from Mitutoyo Corporation was used to measure the maximum heights Rz1 and Rz2. The measurement mode was JIS 2001, the measurement speed was 0.5 mm/s, the measurement distance was 16 mm, the number of measurements was 5, and the maximum values measured were used. Those results are shown in Table 1. The thickness, porosity, and maximum heights Rz1 and Rz2 as shown in Table 1 were measured before the compression deformation treatment.

Figure 2:
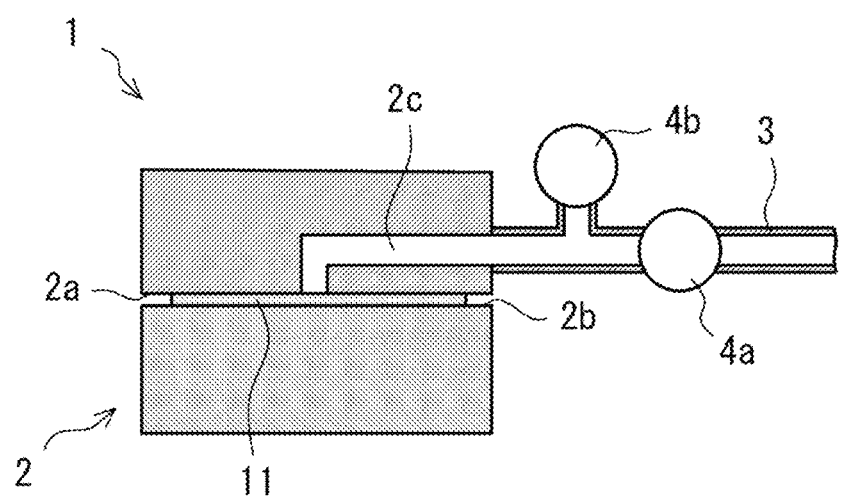
FIG. 2 shows an air permeability measuring device used to measure an air permeability of each of titanium-based porous bodies according to Examples and Comparative Examples together with the titanium-based porous bodies. This is a cross-sectional view along a thickness direction of the titanium-based porous body.

In addition, for each titanium-based porous body, the air permeability under pressure was measured using an air permeability measuring device 1 as shown in FIG. 2. The air permeability measuring device 1 has a pair of flat surfaces 2a, 2b that sandwich a titanium-based porous body 11 cut into a 40 mm square from both sides in the thickness direction, and includes a pressing machine 2 capable of applying a compression force to reduce the thickness of the titanium-based porous body 11 by allowing those flat surfaces 2a, 2b to be close to each other; a gas feed pipe 3 in communication with an internal flow path 2c formed so as to open on one flat surface 2a inside the press machine 2; and a flowmeter 4a and a pressure gauge 4b provided in the middle of the gas feed pipe 3. The gas feed pipe 3 had an inner diameter of 6 mm, the internal flow path 2c had an inner diameter of 5 mm, and the air permeability measuring device 1 having circular flat surfaces 2a, 2b each having a diameter of 60 mm was used. The arithmetic average roughness Ra (JIS B 0601 (1994)) of the flat surfaces 2a, 2b was 1.6 µm or less, and the flatness of the flat surfaces 2a, 2b was 0.01 mm or less. The parallelism of the flat plates each having flat surfaces 2a, 2b was 0.01 mm or less.

In the air permeability measurement, the titanium-based porous body 11 was set in the air permeability measuring device 1, a pressure of 65 MPa was applied in the direction in which the flat surfaces 2a, 2b approached, and while maintaining the pressure, the air was fed from the gas feed pipe 3 and the internal flow path 2c to the center of the titanium-based porous body 11 in the plane view at 1.0 L/min, and the pressure of the air during the feed was measured by the pressure gauge 4b. At this time, the air fed from the opening of the flat surface 2a to the titanium-based porous body 11 passes through the interior of the titanium-based porous body 11, and then discharged from the gap between the flat surfaces 2a, 2b around the titanium-based porous body 11. It can be said that the smaller the air permeability resistance, which is the pressure of the air, the better the air permeability when the pressure is applied. For each titanium-based porous body 11, the air permeability resistance was measured twice in total: once for each of the case where the molding surface side surface was positioned on the side of the flat surface 2a to which the air of the pressing machine 2 was fed, and the case where the surface on the opposite side was positioned. Table 1 shows a ratio of the air permeability resistance when the molding surface side surface was located to the air permeability resistance when the opposite side surface was located on the flat surface 2a side (air permeability resistance on the molding surface side surface/air permeability resistance on the opposite side surface). A larger air permeability resistance ratio means that a difference between the air permeability resistances on the opposite side surface and the molding surface side surface is larger, and the opposite side surface has improved air permeability. In Examples, an air permeability resistance ratio of 1.20 or more was evaluated as acceptable, 1.25 or more as good, and 1.30 or more as excellent.

Here, using the pressing machine 2 of the air permeability measuring device 1 as described above, the compression deformation rate of each titanium-based porous body 11 as described above was also measured.

TABLE 1

| | Titanium Containing Powder | | | Sintering Conditions | | Titanium Porous Body | |
|---|---|---|---|---|---|---|---|
| | D10 (µm) | D90 (µm) | D90/D10 | Temperature (° C.) | Time (hr) | Thickness (mm) | Porosity (%) |
| EX. 1 | 26 | 96 | 3.7 | 1000 | 3 | 0.5 | 62 |
| EX. 2 | 25 | 65 | 2.6 | 1000 | 3 | 0.5 | 59 |
| EX. 3 | 17 | 45 | 2.6 | 1000 | 3 | 0.5 | 58 |
| EX. 4 | 8 | 20 | 2.5 | 1000 | 3 | 0.5 | 39 |
| EX. 5 | 25 | 65 | 2.6 | 1100 | 2 | 0.5 | 58 |
| EX. 6 | 8 | 20 | 2.5 | 1000 | 3 | 0.7 | 36 |
| Comp. 1 | 51 | 116 | 2.3 | 900 | 1 | 0.5 | 61 |
| Comp. 2 | 51 | 116 | 2.3 | 1000 | 3 | 0.5 | 61 |
| Comp. 3 | 26 | 96 | 3.7 | 900 | 1 | 0.5 | 63 |
| Comp. 4 | 25 | 65 | 2.6 | 900 | 1 | 0.5 | 61 |
| Comp. 5 | 17 | 45 | 2.6 | 900 | 1 | 0.5 | 67 |
| Comp. 6 | 25 | 65 | 2.6 | 950 | 2 | 0.5 | 60 |
| Comp. 7 | 8 | 20 | 2.5 | 1000 | 3 | 1.0 | 26 |
| Comp. 8 | 29 | 44 | 1.5 | 1000 | 3 | 0.5 | 59 |
| Comp. 9 | 13 | 21 | 1.6 | 1000 | 3 | 0.5 | 46 |

| | Titanium Porous Body | | | | | | |
|---|---|---|---|---|---|---|---|
| | Compression | Maximum height | | | Air Permeability Resistance | | |
| | Deformation Rate (%) | Molding Surface Side Surface Rz1 (µm) | Opposite Side Surface Rz2 (µm) | Rz2/Rz1 | Molding Surface Side Surface (MPa) | Opposite Side Surface (MPa) | Air Permeability Resistance Ratio |
| EX. 1 | 19 | 27 | 126 | 4.7 | 46 | 35 | 1.31 |
| EX. 2 | 14 | 29 | 68 | 2.3 | 51 | 38 | 1.34 |
| EX. 3 | 10 | 25 | 55 | 2.2 | 49 | 39 | 1.26 |
| EX. 4 | 4 | 21 | 29 | 1.4 | 141 | 109 | 1.29 |

TABLE 1-continued

| | | | | | | | |
|---|---|---|---|---|---|---|---|
| EX. 5 | 12 | 27 | 68 | 2.5 | 45 | 31 | 1.45 |
| EX. 6 | 3 | 19 | 27 | 1.4 | 149 | 115 | 1.30 |
| Comp. 1 | 27 | 26 | 114 | 4.4 | 74 | 57 | 1.30 |
| Comp. 2 | 20 | 47 | 108 | 2.3 | 37 | 28 | 1.32 |
| Comp. 3 | 26 | 43 | 105 | 2.4 | 97 | 70 | 1.39 |
| Comp. 4 | 25 | 27 | 70 | 2.6 | 106 | 80 | 1.33 |
| Comp. 5 | 25 | 29 | 72 | 2.4 | 128 | 100 | 1.28 |
| Comp. 6 | 20 | 30 | 67 | 2.2 | 85 | 67 | 1.27 |
| Comp. 7 | — | — | — | — | — | — | — |
| Comp. 8 | 16 | 52 | 59 | 1.1 | 121 | 117 | 1.03 |
| Comp. 9 | 10 | 30 | 33 | 1.1 | 154 | 144 | 1.07 |

As can be seen from Examples 1 to 6 as shown in Table 1, the titanium-based porous body produced by heating the titanium-containing powder having the predetermined particle diameter under predetermined sintering conditions has good porosity, compression deformation, maximum heights Rz and air permeability.

On the other hand, in each of Comparative Examples 1 to 6, the particle diameter of the titanium-containing powder and/or the sintering conditions were out of the predetermined ranges, so that the compression deformation rate and the maximum heights Rz of the titanium-based porous body were increased.

In Comparative Example 7, the thickness of the titanium-based porous body was thicker, so that the porosity was smaller. Therefore, in Comparative Example 7, the compression deformation rate, maximum heights Rz and air permeability were not measured.

In Comparative Example 8, the particle diameter of the titanium-containing powder was out of the predetermined range, so that the maximum height Rz1 of the molding surface side surface was higher and the maximum height ratio (Rz2/Rz1) was lower, and the air permeability resistance ratio was smaller. In Comparative Example 9, although the maximum height Rz1 of the molding surface side surface was lower than that in Comparative Example 8, the air permeability resistance ratio remained small and was not improved.

Figure 1B:
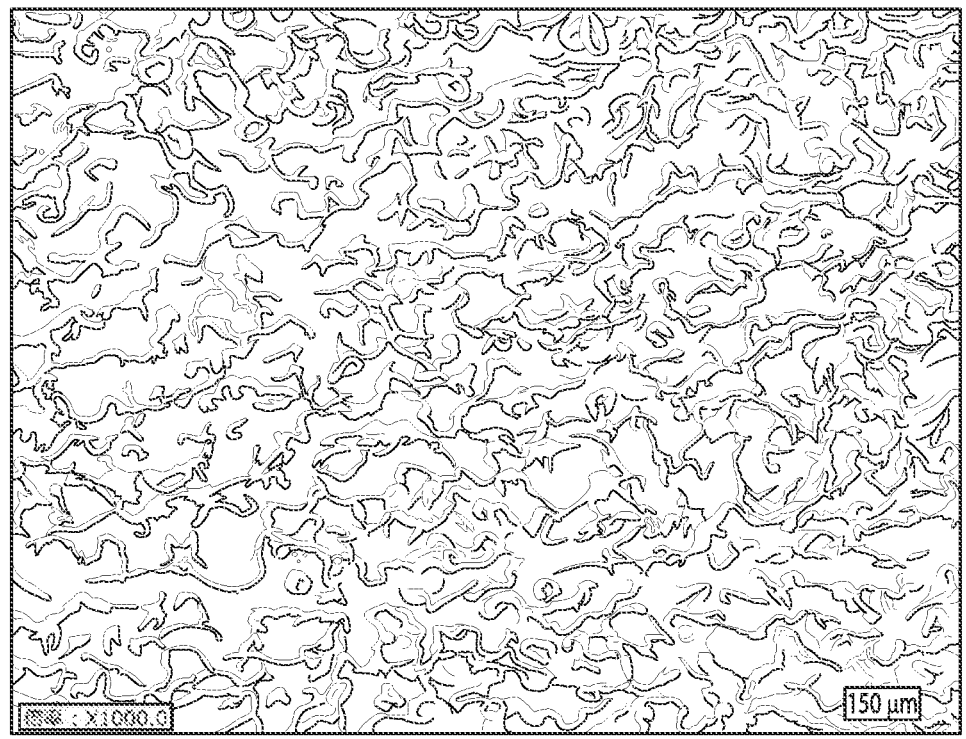
FIG. 1(b) is a SEM photograph of an electrolyte membrane against which a surface on the opposite side is pressed.

Further, each titanium-based porous body produced under the same conditions as those in Examples as described above was pressed against Nafion (registered trademark) as an electrolyte membrane on the molding surface side surface or the opposite side surface at a pressure of 65 MPa, and the surface of the electrolyte membrane was then observed. As a reference, FIG. 1 shows SEM photographs of the surface of the electrolyte membrane against which the molding surface side surface of Example 4 was pressed (FIG. 1(a)) and the surface of the electrolyte membrane against which the opposite side surface was pressed (FIG. 1(b)). From FIG. 1, it is found that the surface of the electrolyte membrane against which the molding surface side surface of the titanium-based porous body according to Example 4 was pressed was smoother than the surface of the electrolyte membrane against which the opposite side surface was pressed, and it is presumed that the molding surface side surface has good adhesion to the electrolyte membrane.

DESCRIPTION OF REFERENCE NUMERALS 1 air permeability measuring device
2 pressing machine
2a, 2b flat surface
3 gas feed pipe
4a flowmeter
4b pressure gauge

The invention claimed is:

1. A titanium-based porous body in a form of a sheet, the titanium-based porous body containing titanium,
wherein the titanium-based porous body has a thickness of 0.8 mm or less, a porosity of 30% to 65%, a maximum height Rz1 of one sheet surface of 30 μm or less, a ratio of a maximum height Rz2 of other sheet surface to the maximum height Rz1 of the one sheet surface (Rz2/Rz1) of 1.2 or more, and a compression deformation rate of 19% or less.

2. The titanium-based porous body according to claim 1, wherein the compression deformation rate is 12% or less.

3. The titanium-based porous body according to claim 1, wherein the titanium-based porous body has a titanium content of 75% by mass or more.

4. The titanium-based porous body according to claim 3, wherein the titanium content is 98% by mass or more.

5. The titanium-based porous body according to claim 1, wherein the compression deformation rate is 12% or less and wherein the titanium-based porous body has a titanium content of 75% by mass or more.

6. The titanium-based porous body according to claim 5, wherein the titanium content is 98% by mass or more.

7. A method for producing a titanium-based porous body, the method comprising:
a raw material preparation step of preparing, as a raw material, a titanium-containing powder having a 10% particle diameter D10 of 30 μm or less and a 90% particle diameter D90 of 15 μm to 105 μm, and has a ratio (D90/D10) of the 90% particle diameter D90 to the 10% particle diameter D10 of 2.0 or more;
a powder depositing step of depositing the titanium-containing powder on a molding surface of a mold in a dry process; and
a powder sintering step of heating the titanium-containing powder on the molding surface to a temperature of 980° C. or more for 2 hours or more.

8. The method for producing a titanium-based porous body according to claim 7, wherein a titanium-based porous body having a thickness of 0.8 mm or less is produced.

* * * * *